(12) United States Patent
Mathews, Jr. et al.

(10) Patent No.: US 11,584,395 B2
(45) Date of Patent: Feb. 21, 2023

(54) VEHICLE ENERGY MANAGEMENT SYSTEM

(71) Applicant: Transportation IP Holdings, LLC, Norwalk, CT (US)

(72) Inventors: Harry Kirk Mathews, Jr., Niskayuna, NY (US); James D. Brooks, Schenectady, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 293 days.

(21) Appl. No.: 16/727,320

(22) Filed: Dec. 26, 2019

(65) Prior Publication Data

US 2021/0031802 A1    Feb. 4, 2021

Related U.S. Application Data

(60) Provisional application No. 62/881,046, filed on Jul. 31, 2019.

(51) Int. Cl.
*B60W 30/14* (2006.01)
*B60W 10/04* (2006.01)
(Continued)

(52) U.S. Cl.
CPC ...... *B60W 60/0023* (2020.02); *B60W 30/146* (2013.01); *G05D 1/0223* (2013.01);
(Continued)

(58) Field of Classification Search
CPC .. B60W 60/0023; B60W 10/04; B60W 10/18; B60W 2555/60; B60W 2710/06;
(Continued)

(56) References Cited

U.S. PATENT DOCUMENTS

2019/0100204 A1* 4/2019 Plianos ........... B60W 30/18127
2019/0375407 A1* 12/2019 Maleki ................. B60W 30/14

FOREIGN PATENT DOCUMENTS

EP    3095661 A2 * 11/2016 ............ B60W 10/02
EP    3219560 A1 *  9/2017 ................ B60L 7/26

OTHER PUBLICATIONS

Albrecht, A., 2016. The key principles of optimal train control—Part 2: Existence of an optimal strategy, the local energy minimization principle, uniqueness, computational techniques, Transportation Research Part B: Methodological, vol. 94, Dec. 2016, pp. 509-538.

(Continued)

*Primary Examiner* — Genna M Mott
(74) *Attorney, Agent, or Firm* — The Small Patent Law Group LLC; Josef L. Hoffmann

(57) ABSTRACT

An energy management system determines two or more fuel components that represent fuel consumption by a vehicle system completing a trip over one or more routes. A trip plan that designates operational settings of the vehicle system at one or more of different locations, different distances along the one or more routes, or different times is generated or modified. The trip plan is based on the fuel components. The fuel components include a delta elevation component of the one or more routes, a delta speed component of the trip, a mean drag component of the vehicle system, a curvature component of the one or more routes, a base fuel component of the vehicle system, a minimum braking component of the vehicle system, a braking auxiliaries component of the vehicle system, and/or a drag variation of the vehicle system.

18 Claims, 6 Drawing Sheets

(51) Int. Cl.
  B60W 60/00 (2020.01)
  G05D 1/02 (2020.01)
  B60W 10/18 (2012.01)
(52) U.S. Cl.
  CPC .............. B60W 10/04 (2013.01); B60W 10/18 (2013.01); B60W 2400/00 (2013.01); B60W 2555/60 (2020.02); B60W 2710/06 (2013.01); B60W 2710/08 (2013.01); B60W 2710/18 (2013.01); B60W 2720/10 (2013.01)
(58) Field of Classification Search
  CPC ......... B60W 2710/08; B60W 2710/18; B60W 2720/10; B60W 2552/05; B60W 30/146; B60W 30/18; B60W 2400/00; G05D 1/0223; G05D 1/0217
  See application file for complete search history.

(56) References Cited

OTHER PUBLICATIONS

Bai, Y., Mao, B., Zhou, F., Ding, Y., Dong, C., 2009. Energy-Efficient Driving Strategy for Freight Trains Based on Power Consumption Analysis, Journal of Transportation Systems Engineering and Information Technology, vol. 9, Issue 3, Jun. 2009, pp. 43-50, 7 pages.

Davis, W.J., 1926. The Tractive Resistance of Electric Locomotives and Cars. Reprint of General Electric Review, v. xxix, No. 10, Oct. 1926, 685-707.

Han, J., Vahidi, A., Sciarretta, A., 2019. Fundamentals of energy efficient driving for combustion engine and electric vehicles: An optimal control perspective, Automatica, vol. 103, May 2019, pp. 558-572 ☆ 15.

Houpt, P.K., Bonanni, P.G., Chan, D., Chandra, R., Kalyanam, K., Sivasubramaniam, M., Brooks, J., McNally, C., 2009. Optimal control of heavy-haul freight trains to save fuel, 9th International Heavy Hand Conference 2009, pp. 1033-1040.

Iwnicki, S., 2006. Handbook of Railway Vehicle Dynamics. CRC Press. https://doi.org/10.1201/9781420004892.

Lukaszewicz, P., 2001. Energy Consumption and Running Time for Trains, : https://www.researchgate.net/publication/260713065.

McClanachan, M., Cole, C., 2012. Current train control optimization methods with a view for application in heavy haul railways. Proceedings of the Institution of Mechanical Engineers, Part F: Journal of Rail and Rapid Transit 226, 36-47. https://doi.org/10.1177/0954409711406352.

Rongfang, L., Golovitcher, I.M., 2003. Energy-efficient operation of rail vehicles , Transportation Research Part A: Policy and Practice, vol. 37, Issue 10, Dec. 2003, pp. 917-932.

Shi, J., Ren, S., Zhang, M., 2019. Model-Based Assessment of Longitudinal Dynamic Performance and Energy Consumption of Heavy Haul Train on Long-Steep Downgrades, Journal of Modern Transportation, Sep. 2014, vol. 22, Issue 3, pp. 127-136.

Sun, Y., Cole, C., Spiryagin, M., Godber, T., Hames, S., Rasul, M., 2014. Longitudinal heavy haul train simulations and energy analysis for typical Australian track routes. Proceedings of the Institution of Mechanical Engineers, Part F: Journal of Rail and Rapid Transit 228, 355-366.

Wu, Q., Luo, S., Cole, C., 2014. Longitudinal dynamics and energy analysis for heavy haul trains, Journal of Modern Transportation, Sep. 2014, vol. 22, Issue 3, pp. 127-136.

Yurenko, K., Fandeev, E., Kharchenko, P., 2018. Investigation of Optimal Train Movement Modes by Means of Simulation Modeling, rusautocon org programme 2018 eng, 6.

* cited by examiner

VEHICLE ENERGY MANAGEMENT SYSTEM

CROSS-REFERENCE TO RELATED APPLICATIONS

This application claims priority to U.S. Provisional Application No. 62/881,046, which was filed on 31 Jul. 2019, and the entire disclosure of which is incorporated herein by reference.

BACKGROUND

Technical Field

The subject matter described herein relates to controlling operation of a vehicle.

Discussion of Art

Vehicles consume energy to operate, whether the energy is provided by fuel, electric current, or the like. The industries of different types of vehicles have attempted to reduce energy consumption by operation of the vehicles. For example, manufacturers of automobiles have sought to increase fuel efficiency or decrease fuel consumption by manufacturing more efficient and/or lighter automobiles, by changing how engines operate (e.g., by automatically turning off during longer stops), etc.

Similarly, the freight rail industry has developed improvements in individual rail vehicle component technologies to reduce energy consumption. For example, changes in engine operation, changes in operation to control traction between the rail vehicles and tracks, changes in operation of power electronics, and the like, have been created to increase fuel efficiency of the rail vehicles. While each improvement may add incremental value to the efficiency of the rail vehicles, it is unclear whether or how to operate these various improvements together to provide for increased overall efficiency (instead of individually improving the efficiency of component parts).

Energy management systems have been developed that receive information about a trip and make determinations related to how a vehicle should operate during the trip. While energy management systems may be beneficial, often energy management systems can be computationally slow and the resulting plan may be difficult to explain to a vehicle operator in understandable terms.

BRIEF DESCRIPTION

In one or more embodiments a method may be provided that includes determining speed requirements during plural sections of a trip of a vehicle system, determining at least one speed restriction section of the plural sections of the trip based on the speed requirements determined, and generating or modifying a trip plan that designates operational settings of the vehicle system at one or more of different locations, different distances along the one or more of the plural sections, or different times, including the operational settings within the at least one speed restriction section. The vehicle system may be then maintained above a first threshold speed within the at least one speed restriction section based on the trip plan, and supplemental propulsion force is not generated in the vehicle system in the at least one speed restriction section until the first threshold speed may be reached, based on the trip plan.

In one embodiment, an energy management system may include one or more processors configured to determine multiple fuel components that represent fuel consumption by a vehicle system completing a trip over one or more routes. The one or more processors may be configured to generate or modify a trip plan that designates operational settings of the vehicle system at one or more of different locations, different distances along the one or more routes, or different times. The one or more processors may be configured to generate or modify the trip plan based on the multiple fuel components. The multiple fuel components that may be determined by the one or more processors may include two or more of a delta elevation component of the one or more routes, a delta speed component of the trip, a mean drag component of the vehicle system, a curvature component of the one or more routes, a base fuel component of the vehicle system, a minimum braking component of the vehicle system, a braking auxiliaries component of the vehicle system, and/or a drag variation of the vehicle system.

In another embodiment, a system may be provided with one or more processors configured to determine multiple fuel components that represent fuel consumption by a vehicle system completing a trip over one or more routes. The one or more processors may be configured to generate or modify a trip plan that designates operational settings of the vehicle system at one or more of different locations, different distances along the one or more routes, or different times, the one or more processors configured to generate or modify the trip plan based on the multiple fuel components, and generate instructions for a vehicle operator that provide at least one rule to following within a determined section.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to an energy management system and method that determine an efficient plan for controlling the vehicle for one or more trips. The energy efficiency can be represented by the amount of fuel or energy consumed per unit distance, time, or the like. The energy management system and method can examine different ways to control the vehicle to determine the efficient plan that causes the vehicle to be more efficient (e.g., consume less energy) to complete a trip within a designated period of time than one or more (or all) other plans for completion of the same trip within the same period of time. The plans can dictate or designate operational settings of the vehicle (e.g., throttle settings, speeds, brake settings, etc.) at different locations, times, and/or distances along the trip.

A system and method are provided for forming a trip plan that identifies speed restriction sections of the trip to save fuel by decreasing speeds, and ordering those speed restriction sections in building the trip plan. For example, in any given section of a trip, a first threshold speed (e.g., a minimum floor or lower speed limit) may be determined along with a second threshold speed (e.g., a maximum ceiling or upper speed limit). The trip plan then provides, and the vehicle system operates, to not fall below the first threshold speed in any speed restriction section. Specifically, the trip plan does not provide for the vehicle system to continuously approach or travel at the second threshold, or maximum, speed. Instead, the trip plan provides that the vehicle should only operate to keep the speed of the vehicle system above the first threshold speed. Thus, as a vehicle is reducing speed, including as a result of going up a hill, the vehicle does not generate supplemental propulsion force until the first threshold speed may be reached. By not generating supplemental propulsion force and traveling below the second threshold speed, fuel savings occurs within the speed restriction sections of the trip.

The system and method can operate to notify an operator of the vehicle system of the lower speed limits without having to add hardware or software to the control system(s) of the vehicle. For example, a portable electronic device such as a smart tablet may prompt a system for driving a vehicle without the need for a energy management system infrastructure. Specifically, the determinations and computations in arriving at the trip plan may be quickly determined and easily explained to a vehicle operator via the portable device. In the example of keeping the vehicle above a minimum speed, the portable electronic device may simply provide a notch position that achieves the minimum speed for a restricted speed section, and the location the notch position should be moved to that position. Thus, a vehicle operator need only follow the simple command of placing a vehicle at a communicated notch position at a given location.

Figure 1:
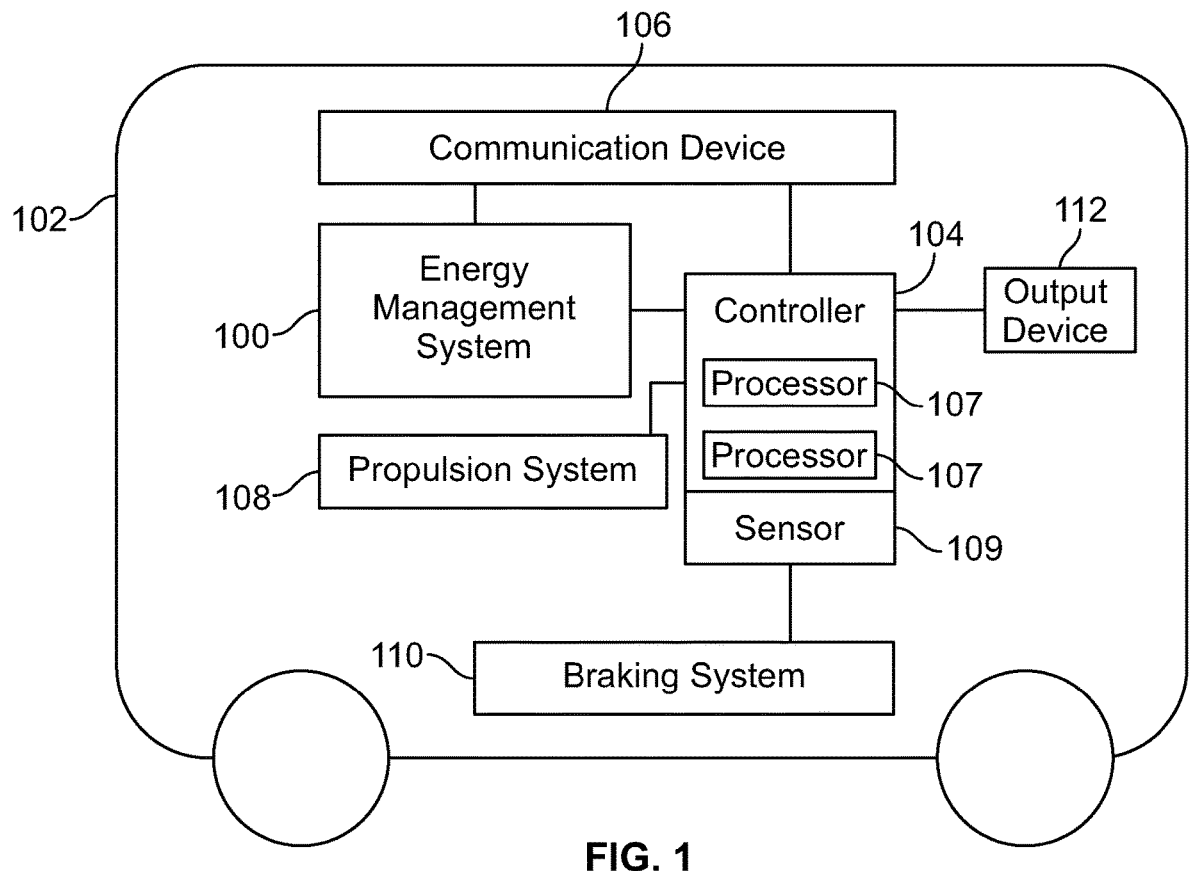
FIG. 1 illustrates one embodiment of a schematic view of an energy management system.

FIG. 1 illustrates one embodiment of an energy management system 100. The energy management system can be disposed onboard a vehicle system 102 as shown, or may be disposed off-board the vehicle system and communicate signals indicative of plans (newly created and/or modified plans) to a controller 104 of the vehicle system via a communication device 106.

The controller represents hardware circuitry that includes and/or may be connected with one or more processors 107 (e.g., one or more integrated circuits, one or more microprocessors, one or more field programmable gate arrays, etc.) that perform and/or control performance of the operations described herein. The controller may also include or be electrically coupled to one or more sensors 109. The one or more sensors may be speed sensors, propulsion based sensors, braking system based sensors, motion sensors, fuel level sensors, global positioning system based sensors, etc. that may be used to determine speed data and information, data and information related to determining fuel and/or fuel components, data and information related to throttle settings, braking settings, or notch settings, or the like. The communication device represents communication circuitry, such as one or more antennas, modems, or the like, that wirelessly communicate signals.

The controller can generate and communicate signals to an output device 112 (e.g., a display), to a propulsion system 108, and/or to a braking system 110 of the vehicle. The signals can be sent to the output device to present instructions or rule to an operator on how to control the vehicle according to the trip plan. The signals may be sent to the propulsion system (e.g., one or more engines, motors, or the like) and/or the braking system to allow the controller to automatically control operation of the movement of the vehicle.

The vehicle system is illustrated as a land-based vehicle, such as an automobile, rail vehicle, mining vehicle, agricultural vehicle, or other off-highway vehicle, but optionally can represent another type of vehicle, such as a marine vessel or an aircraft. The vehicle system is shown as a single vehicle, but may be formed from several vehicles mechanically and/or logically coupled with each other. Mechanically coupled vehicles can travel together as a vehicle system while the vehicles are connected with each other (e.g., by a coupler, trailer hitch, etc.). Logically coupled vehicles can travel together as a vehicle system by communicating with each other to coordinate the movements of the individual vehicles so that the vehicles move as a group. A vehicle system may be formed from two or more vehicles that are logically, but not mechanically, coupled with each other.

The energy management system also represents same or different hardware circuitry that includes and/or may be connected with the same or different one or more processors as the controller. The energy management system may be configured to make determinations related to the speed requirements of a trip. Speed requirements as used herein include any change in operation of the vehicle system that may affect the speed of the vehicle system. As an example, minimum or lower limit threshold operating speeds or maximum or upper limit threshold speeds may be considered speed requirements. This may include thresholds mandated by a governmental authority such as a speed limit, thresholds resulting from traffic increases, thresholds determined based on a population of people or other vehicle systems of a section of a route, etc. Speed requirements may also be based upon load requirements of an engine, prime mover, energy storage device, or the like. In particular, such loading requirements, restrictions, parameters, characteristics, etc. may affect the operating speed of the vehicle system. In another embodiment, a change in fuel efficiency may be considered a speed requirement because changes in fuel consumption may affect the speed of the vehicle system. In yet another example, changes in emission may also be considered a speed requirement, because again, to affect a change in emissions, the speed of the vehicle system must be considered. In another embodiment, environmental conditions, parameters, characteristics, or the like may be considered speed requirements. For example, the condition of a route, such as a track or rail, may cause changes in speed during a section. Alternatively, speed requirement may also be based on road conditions, weather conditions, road construction conditions, etc.

In all, speed requirements may include total energy requirements of a trip, fuel consumption during a trip, terrain and environment constraints, power limits and constraints, etc. to make determinations related to plural sections of a trip. More specifically, the speed requirements may be based on vehicle requirements and/or route requirements. Vehicle requirements may include vehicle conditions, characteristics, and parameters such as fuel efficiency, emissions, vehicle size, vehicle weight, vehicle horsepower, power limits and constraints, speed limits and constraints, etc. Route requirements may include route conditions, characteristics, and parameters such as route length, road condition, rail condition, catenary availability, wayside stations, locations of trip stops, traffic conditions, route speed limits, weather conditions such as rain or drought, etc. By making determinations related to the speed requirements, the energy management system may determine locations of speed restriction sections of the plural sections. In particular, speed requirements may vary based on the location of the vehicle system along a route of a trip.

Speed restriction sections are sections of a trip where the vehicle system may operate at a reduced speed to conserve or save fuel. Example speed restriction sections may include sections of a trip where the vehicle is going down a mountainside, or descending, sections where little wind resistance may be provided, sections where a reduced number of curves, or no curves are in the route, sections where little to no traffic will exist at the time the vehicle traveling the section, etc. A reduced speed may be a speed that may be less than maximum speed of speed limit for a section. For example, in a restricted speed section, the speed limit for the vehicle as determined by a regulatory body may be sixty (60) miles per hour (mph), whereas the reduced speed for saving fuel may be forty (40) mph. Thus, the energy management system would generate or modify a trip plan that indicates in the restricted speed section, the vehicle should operate above a first threshold speed of 40 mph and below a second threshold speed of 60 mph.

In another example, the trip plan may indicate that supplemental propulsion force should only be supplied to the vehicle system if the vehicle system may be operating at or below 40 mph, while a braking force should be applied if the vehicle system may be operating at or above 60 mph. Alternatively, the trip plan may indicate that the vehicle system should operate only at the first threshold speed and apply a supplemental propulsion force when the vehicle drops below 40 mph and apply a braking force when the vehicle increases above 40 mph.

The energy management system in making determinations related to total energy requirements during a trip to determine the speed restriction sections can use a basic energy balance approach. The basic energy balance may require the sum of change in kinetic and potential energy, $\Delta KE + \Delta PE$, be equal the energy applied to move the vehicle system (e.g., the energy applied to the road, rail, etc. from the traction motors) while applying force in the direction of movement ($E_{motor}$) minus losses. Both friction, e.g., losses due to drag ($E_{drag}$) and curving or driving over a curve ($E_{curve}$), and energy dissipated in braking events (e.g., traction motor dynamic braking ($E_{db}$) and air braking ($E_{ab}$), as losses. The total energy balance can then be determined by the energy management system as follows:

$$\Delta KE + \Delta PE = E_{motor} - E_{db} - E_{ab} - E_{drag} - E_{curve}. \quad (1)$$

The above terms may be positive except for $\Delta KE$ and $\Delta PE$, which can be positive or negative. The energy management system can determine the total energy input from Equation 1 as follows:

$$E_{motor} = \Delta KE + \Delta PE + E_{db} + E_{ab} + E_{drag} + E_{curve}. \quad (2)$$

For fuel-consuming vehicle systems (e.g., diesel-electric locomotives) this can represent the energy that must be provided by burning fuel. For other types of vehicle systems, this can represent the energy that must be provided from another source (e.g., stored or obtained electric energy).

Figure 2:
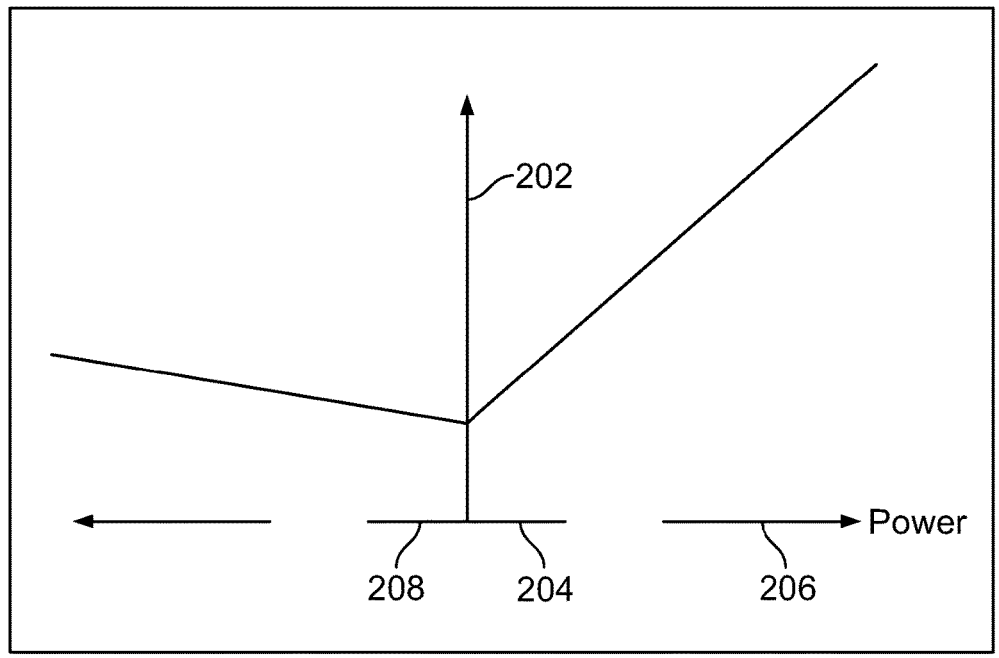
FIG. 2 illustrates a graph of energy consumption (e.g., fuel burn) versus power generated by the propulsion system.

FIG. 2 illustrates a relationship between energy consumption 202 (e.g., fuel burn rate) versus power generated 204 by the propulsion system. This relationship can be approximated by a piecewise linear function (e.g., Equation 3 below). Positive and negative values of power, P, along the horizontal axis in FIG. 2 represent motoring 206 and dynamic braking 208, respectively. The incremental fuel burn during dynamic braking (DB) may be relatively small (e.g., i.e. $m_{brake} \ll m_{motor}$), representing only engine auxiliaries (not including dynamic braking cooling fans which can be powered directly from the regenerated braking energy).

$$\frac{dFuel}{dt} = \begin{cases} m_{motor}P + b_{fuel} & P \geq 0 \quad \text{(motoring)} \\ m_{brake}P + b_{fuel} & P < 0 \quad \text{(dynamic braking)} \end{cases} \quad (3)$$

Energy may be analytically converted to fuel (without the need to simulate driving the vehicle system) by the energy management system by integrating the fuel burn rate. In one embodiment, the energy management system can use a relationship such as that shown below in Equation 4 to convert the energy to fuel. Due to the piece-wise nature of the approximation, the fuel equation of Equation 4 separates into three terms: motoring, braking and base fuel (e.g., idle fuel, which can be present at all power levels), where T is the trip time and P is the tractive power (negative for braking).

$$\text{Fuel} = m_{motor} \underbrace{\int_{P \geq 0} P \, dt}_{E_{motor}} + m_{brake} \underbrace{\int_{P < 0} P \, dt}_{E_{db}} + \int_0^T b_{fuel} dt \quad (4)$$

The first two integral terms above may be $E_{motor}$ and $E_{brake}$ from the energy balance derivation, respectively. Rewriting Equation 4 with these substitutions yields $$\text{Fuel} = \underbrace{m_{motor} E_{motor}}_{\text{motoring}} + \underbrace{m_{brake} E_{db}}_{\text{braking auxilaries}} + \underbrace{T b_{fuel}}_{\text{base fuel}} \quad (5)$$

The final energy balance equation can be determined by the energy management system by replacing the motoring energy, $E_{motor}$, with Equation 2, thereby yielding seven components. The drag term can be further broken into a drag at mean speed and variation from mean speeds for a total of eight terms, as shown in Equation 6:

$$\text{Fuel} = \quad (6)$$

$$m_{motor}\left(\Delta KE + \Delta PE + \underbrace{E_{db} + E_{ab}}_{E_{brake}} + E_{drag} + E_{curve}\right) + m_{motor}E_{db} + T b_{fuel}$$

The dynamic braking energy appears twice in Equation 6. The first occurrence may be the fuel required to make up the energy lost to braking to maintain the same trip time (e.g., the dynamic braking energy does not occur during the braking events). The second occurrence accounts for the vehicle system engine running to provide energy for dynamic braking auxiliaries during the braking events.

A two part process may be used by the energy management system to calculate each term for a given vehicle system makeup and trip section. The vehicle system makeup can include information such as how many vehicles are included in the vehicle, the weights of the different vehicles, the locations of the vehicles in the vehicle system, etc.). The trip section can include information on the route to be traveled, such as speed limits, grades, curvatures, and the like. Several of the terms can be analytically calculated using only travel time and can be independent of the details of the operational trajectory (e.g., power applied over time and the resulting speed of the vehicle system): $\Delta KE$, $\Delta PE$, $E_{drag}+E_{curve}$, and the base fuel. The energy management system can determine one or more (or all) of the remaining terms by simulating a movement trajectory of the vehicle system.

These are summarized in Table 1 below where T is the trip time, X is the trip distance, is the total cumulative effective (e.g., mass weighted average over the train) degrees-of-curvature integrated (summed) over the route(s) for the trip, $\Delta$Elevation is the change in effective elevation (e.g., effective mass weighted average over the vehicle system), $\overline{V}$, $\overline{V^2}$, $\overline{V^3}$ are the first three statistical moments of speed over time, $$\overline{V} = \frac{X}{T}$$

(mean speed), $V_{start}$, $V_{end}$ are the assumed or designated beginning and end speeds of the trip, M is the total mass of the vehicle system, a, b, c are the Davis' drag coefficients, g is standard gravitational acceleration, and $\varepsilon_{curve}$ is the equivalent grade per degree of curvature (e.g., 0.04%)/°.

system, such as a locomotive), $\theta_i$ is the grade experienced by the $i^{th}$ vehicle in the vehicle system at the current route location, $D_i$ is the degree-of-curvature experienced by the $i^{th}$ vehicle in the vehicle system at the current route location, $F_i$ is the coupler force on the rear coupler of the $i^{th}$ vehicle in the vehicle system (if the $i^{th}$ vehicle is mechanically coupled with another vehicle in the vehicle system), and $F_{i-1}$ is the coupler force on the front coupler of the $i^{th}$ vehicle in the vehicle system rear of the $(i-1)^{th}$ vehicle in the vehicle system (if the $i^{th}$ vehicle is mechanically coupled with another vehicle in the vehicle system).

The energy management system can assume that the couplers between mechanically coupled vehicles in the vehicle system are rigid couplers (i.e. $v_i=V$ for all i vehicles) and can sum over the vehicle system (all i) to eliminate coupler forces (as equal and opposite pairs can cancel each other out), thereby yielding a form that provides definitions for the effective grade and curvature. The effective route quantity (e.g., grade and curvature) can be the mass weighted average expressed by:

$$M\dot{V} = TE - Mg(a + b\overline{V} + c\overline{V^2}) - \underbrace{\sum m_i g \theta_i}_{\substack{Mg(\frac{1}{M}\Sigma m_i \theta_i) \\ \text{effective} \\ \text{grade},\tilde{\theta}}} - \underbrace{\sum m_i g \varepsilon_{curve} D_i}_{\substack{Mg(\frac{1}{M}\Sigma m_i D_i) \varepsilon_{curve} \\ \text{effective} \\ \text{curvature},\hat{D}}} - AB. \quad (8)$$

Optionally, this relationship can be expressed in terms of effective grade and curvature the point mass model and be simplified to:

TABLE 1

Summary Of Fuel Components

| Component | Equation | Dependencies | Sign | |
|---|---|---|---|---|
| Delta Elevation ($\Delta PE$) | Mg ($\Delta$Elevation) $m_{motor}$ | mass, terrain | +/− | analytic |
| Delta Speed ($\Delta KE$) | $\frac{1}{2}$M ($V_{end}^2 - V_{start}^2$) $m_{motor}$ | mass | +/− | |
| Mean Drag | Mg (a + b$\overline{V}$ + c$\overline{V^2}$) X $m_{motor}$ | mass, time, distance, number of axles | + | |
| Curvature | $Mg \underbrace{\left(\frac{\varepsilon_{grade}}{100} D_{sum}\right)}_{equivalent\ \Delta Elevation} m_{motot}$ | mass, track | + | |
| Base | T · $b_{feul}$ | time | + | |
| Minimum Braking | ($E_{db} + E_{ab}$) $m_{motor}$ | mass, terrain | + | via simulation |
| Braking Auxiliaries | $E_{db}$ $m_{brake}$ | mass, terrain | + | |
| Drag Variation | $Mg(b((\overline{V}^2 - \overline{V^2}) + c(\overline{V}^3 - \overline{V^3}))T\ m_{motor}$ | mass, time, speed profile | + | |

Before presenting the detailed derivations for each energy component, the model for the vehicle system that may be used by the energy management system for the simulated terms is described. A simple point mass model can be used by the energy management system in the derivations of the energy components which have a dependence on route grade and curvature. The equation of motion for the point-mass model can be represented as:

$$m_i\dot{v}_i = TE_i - m_i g(a+bv_i+cv_i^2) - m_i g\theta_i - m_i g\varepsilon_{curve}D_i - AB_i + F_{i-1} - F_i \quad (7)$$

where $m_i$ is the mass of $i^{th}$ vehicle in the vehicle system, $v_i$ is the speed of $i^{th}$ vehicle in the vehicle system, $TE_i$ is the tractive effort of the $i^{th}$ vehicle in the vehicle system (only non-zero for propulsion-generating vehicles in the vehicle $$M\dot{V} = TE - Mg(a+b\overline{V}+c\overline{V^2}) - Mg\hat{\theta} - Mg\hat{D}\varepsilon_{curve} - AB. \quad (9)$$

With respect to delta elevation, the energy management system can determine the first energy component (the change in potential energy from the start to the end of the trip of interest, $\Delta PE$) from the definition gravitational potential energy, $Mg\Delta h$, where M is the total mass of the vehicle system and $\Delta h$ is the change in elevation from the beginning of the route(s) to the end. The component can be either positive or negative depending on the terrain.

With respect to delta speed, the energy management system can determine the second component (the energy difference due to the start and final speeds of the vehicle system, $\Delta KE$) using the definition of kinetic energy, $\frac{1}{2}MV^2$. The difference in kinetic energy between the end and start speeds may be the same (e.g., no movement or zero kinetic energy), resulting in zero net energy. Like the potential energy, the second component can take on either positive or negative values.

With respect to drag, the energy management system can determine the third component (the energy to overcome drag) based on the velocity profile traveled or to be traveled by the vehicle system. The standard Davis' drag equation can be used by the energy management system with the coefficients modified to represent modern vehicle systems (as shown below in Table 2). The Davis equation for drag force has three terms, constant, linear and quadratic in velocity, which for the $i^{th}$ vehicle can be expressed as:

$$F_{drag_i} = m_i g(a_i + b_i V + c_i V^2). \quad (10)$$

The values of a and c can be defined for each $i^{th}$ vehicle in the vehicle system as $$a_i = \alpha_i + \beta_i \frac{n_{axles_i}}{m_i g} \text{ and } c_i = \frac{\gamma_i A_i}{m_i g},$$

respectively, yielding the following expression:

$$F_{drag_i} = \alpha_i m_i g + \beta_i n_{axles_i} + b_i m_i g V + \gamma_i A_i V^2. \quad (11)$$

The energy management system can sum this over all vehicles in the vehicle system to determine the Davis equation for the entire vehicle system as:

$$F_{drag} = \underbrace{\underbrace{\sum_i \alpha_i m_i g}_{aMg} + \underbrace{\sum_i \beta_i n_{axles_i}}_{\beta n_{axles}}}_{aMg(drag\ a)} + \underbrace{\sum_i b_i m_i g}_{bMg\ drag\ b} V + \underbrace{\sum_i \gamma_i A_i}_{cMg\ drag\ c} V^2. \quad (12)$$

The energy lost to drag can be determined by the energy management system integrating $F_{drag}$ over the trip as follows:

$$E_{drag} = \int_0^X F_{drag} dx = \int_0^T F_{drag} V dt = Mg(a\overline{V} + b\overline{V^2} + c\overline{V^3})T. \quad (13)$$

Much or most of the drag energy can be contributed to the mean speed, $$\overline{V} = \frac{X}{T},$$

so the energy management system can separate the drag energy into the mean drag (drag at mean speed) and drag variation as follows:

$$E_{drag} = \underbrace{Mg(a\overline{V} + b\overline{V}^2 + c\overline{V}^3)T}_{mean\ drag} + \underbrace{Mg(b(\overline{V^2} - \overline{V}^2) + c(\overline{V^3} - \overline{V}^3))T}_{drag\ variation} \quad (14)$$

The energy management system can determine the mean drag by factoring $\overline{V}$ and recognizing $\overline{V}T$ is just X, which yields Mg $(a+b\overline{V}+c\overline{V}^2)$ X. The drag variation can be a function of the second and third statistical moments of speed and can be dependent on the specific speed profile. The energy management system can calculate the drag variation from the speed profile used to calculate the reduced or minimum braking components (as described below).

TABLE 2

| Vehicle Type | Davis Drag Coefficients | | | | | |
| --- | --- | --- | --- | --- | --- | --- |
| | α (lbf/ton) | β (lbf/axle) | b (lbf/mph/ton) | γ (lbf/ft²/mph²) | A (ft²) | $n_{axles}$ (—) |
| Locomotive, Lead | 1.3 | 29 | 0.03 | 0.0024 | 120 | 6 |
| Locomotive, Trail | 1.3 | 29 | 0.03 | 0.0005 | 120 | 6 |
| Freight Car | 0.6 | 20 | 0.01 | 0.000778 | 90 | 4 |

With respect to curvature, the energy management system can determine the curvature by converting curvature to equivalent grade at 0.04% grade per degree-of-curvature. The energy thus appears in the same form as the potential energy due to elevation:

$$Mg\underbrace{\left(\frac{\varepsilon_{grade}}{100} \int_0^X |D| dx\right)}_{equivalent\ \Delta elevation}, \text{ where } \varepsilon_{grade} = 0.04 \%\ grade\ /\ ° \text{ Curvature.}$$

The energy management system can determine a lower limit or minimum braking for many routes as a non-zero value to avoid violating speed limits of the routes. For example, a vehicle system at the crest of a hill moving at a lower speed (e.g., ten miles per hour) can coast down the hill and gain speed in the process. If the speed exceeds the speed limit at any point, then some braking may be needed to avoid continued violation of the speed limit. The energy management system can determine that the sum of the energy dissipated by such events as the minimum braking energy (even if less braking energy may be possible). The energy management system can calculate the amount of minimum braking energy as a function of trip time. The value can be constant for trips longer than a specific time (e.g., longer than a transition point, or TP). Trips shorter than the TP may require dissipation of progressively increasing braking energy.

Figure 3:
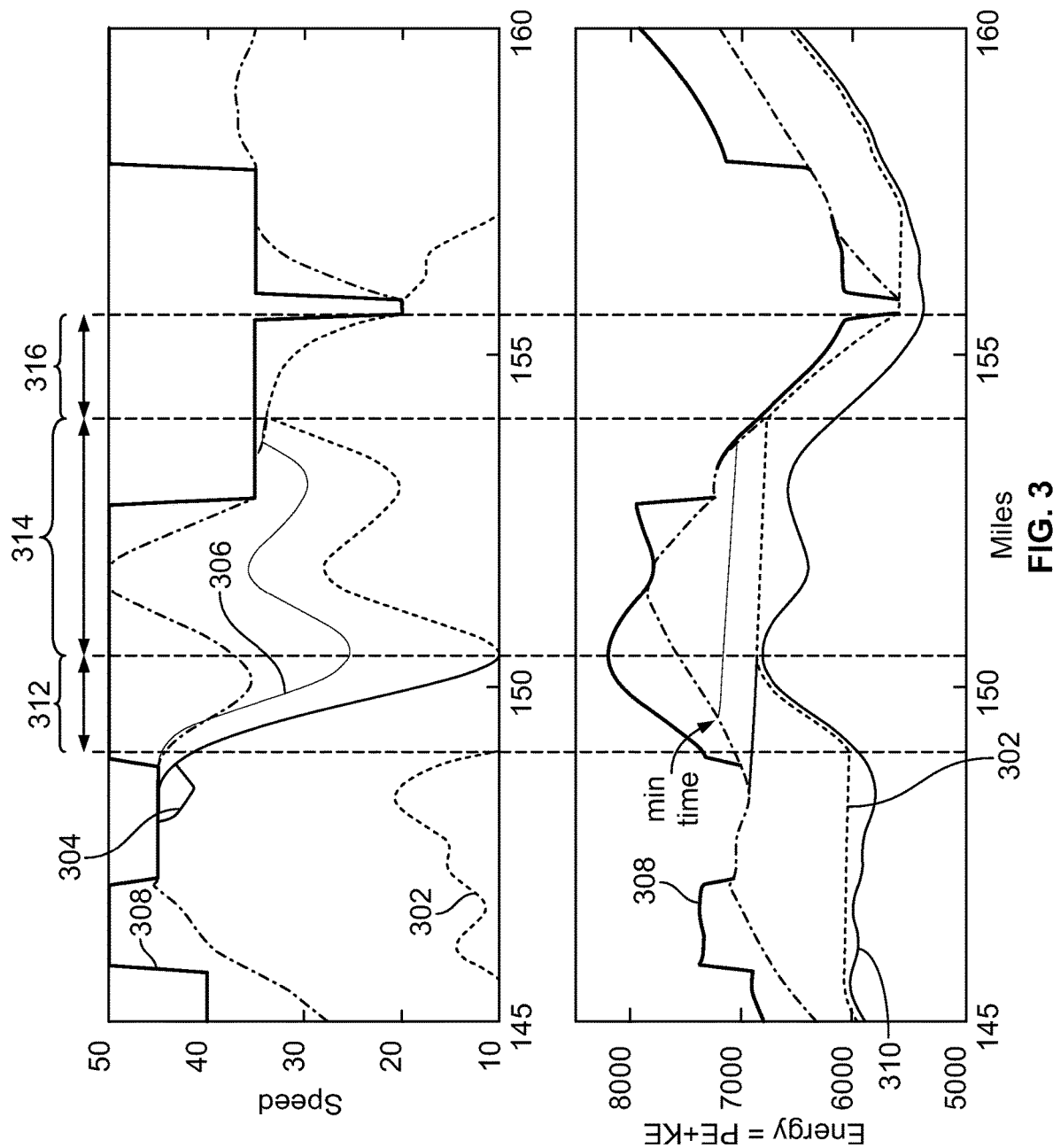
FIG. 3 illustrates one embodiment of schematic view simulating movement of the vehicle system using the energy management system.

The energy management system can calculate the minimum braking energy via simulation of movement of the vehicle system. FIG. 3 illustrates one example of simulating movement of the vehicle system using the energy management system. Both speed and total energy of the vehicle system are shown in FIG. 3. The simulated movement include minimum braking 302, TP 304, and faster than TP 306. Additionally, a speed limit 308, along with potential energy resulting from the terrain 310. For the speed and total energy illustrated a minimum speed region 312, coast region 314, and brake region 316 are illustrated.

For trips that are longer than the TP, the minimum braking energy may be computed by the energy management system simulating the vehicle system running a notch-at-speed rule of idle@10 mph, where 10 miles per hour may be treated to be the minimum speed or lower speed limit. The energy management system integrates the braking power to obtain the braking energy (see, for example, the lowest braking line in FIG. 3. Only the second coasting region may result in a braking event. The first coasting region (just past mile 145) does not result in a braking event.

The speed and power profile at the TP are found by the energy management system extending the idle region backward from the crest until the idle region intersects the minimum time profile speed. By construction, the TP profile has the same braking energy as slower trips. For trips faster than the TP, the speed in these coasting regions in increased, buying time (e.g., due to a faster trip) at the expense of additional braking energy consumption.

The braking energy due to dynamic braking (DB) and airbrake (AB) may be accumulated separately resulting in two braking energies, $E_{db}$ and $E_{ab}$. However, the braking energy may be a function of the sum of the two. The braking energy in DB may be needed by the energy management system to calculate the DB auxiliaries energy below.

To meet the desired trip time the total braking energy, $E_{db}$ $E_{ab}$, is supplied by the propulsion-generating vehicles elsewhere during the trip. It is, therefore, converted to fuel using the motoring fuel burn slope, $m_{motor}$. This fuel may not be consumed during the braking event. The braking results in a slower speed and therefore longer trip time, causing other sections of the trip to run faster, thereby burning more fuel.

With respect to dynamic braking (DB) auxiliaries, during dynamic braking the propulsion-generating vehicles may burn fuel to supply power to the DB auxiliaries that are not directly powered from the traction motors (e.g., which can run as generators in DB). The fuel burned in DB can be a function of the braking energy, but the DB portion, $E_{db}$, which may be converted fuel using the dynamic braking fuel burn slope, $m_{brake}$.

Figure 4:
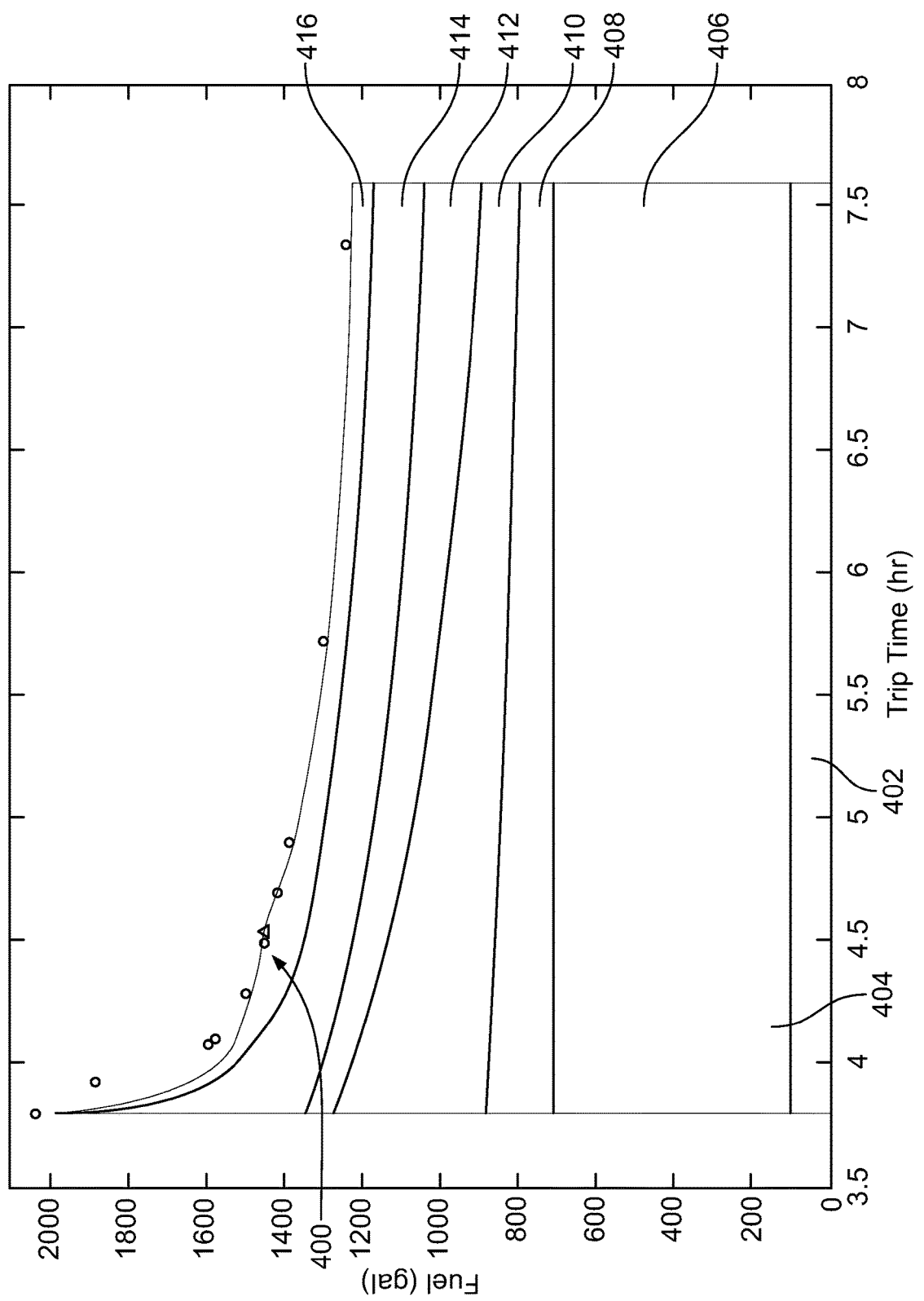
FIG. 4 illustrates an example graph of fuel components as a function of trip time for an example route, as determined by the energy management system.

FIG. 4 illustrates the fuel components as a function of trip time for an example section, as determined by the energy management system. By making determinations related to the fuel components, the energy management system may identify speed restriction sections of the trip where potential fuel savings may occur from traveling at reduced speeds. The fuel components illustrated include delta elevation 402, track curvature 404, average drag a 406, average drag b 408, average drag c 410, base 412, minimum braking 414, and drag variation 416. Each of these are as described and calculated above.

The initial and final speeds are assumed to be the equal by the energy management system, so the delta speed component is zero. Several fuel and time solutions obtained from the energy management system also are shown. The minimum braking, DB auxiliaries, and drag variation components are dependent on a specific speed and power profile and are thus calculated by simulation, as described above. For simplicity, the simulation may ignore the rate limits (notch and airbrake). Alternatively, these limits may be enforced, causing some tradeoff of fuel for smoother train handling.

There may be a cusp 400 in the drag variation component at the TP. Reducing or minimizing braking energy can cause larger variations in speed, thereby increasing the fuel consumption. Fuel optimal controllers, e.g. Energy management system do not have this cusp by braking more than min brake and reducing the drag variation. Near the TP, a tradeoff between braking and drag variation may be possible and beneficial. For travel times longer than the TP, minimum braking may also be minimum fuel. In practice, operations times are typically shorter than the TP. In optimal pacing (arrival time management) situations, this may not be true.

Figure 5A:
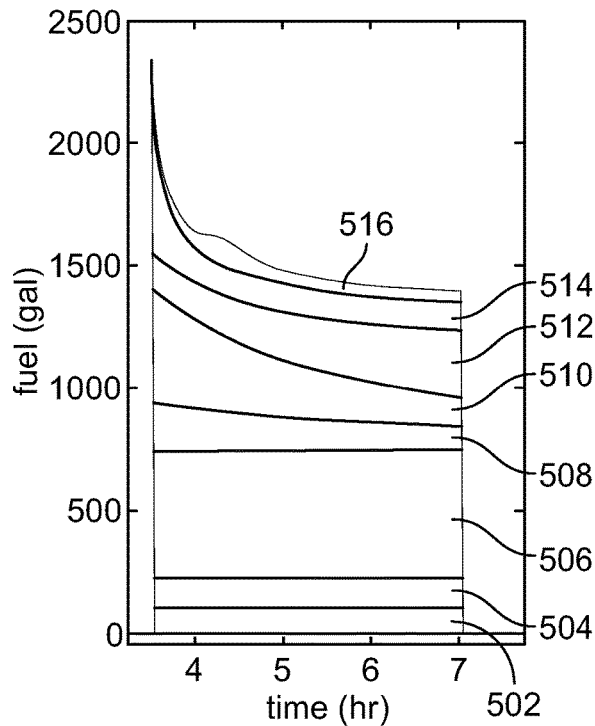
FIG. 5A illustrates an example graph of fuel components as a function of trip time.
Figure 5B:
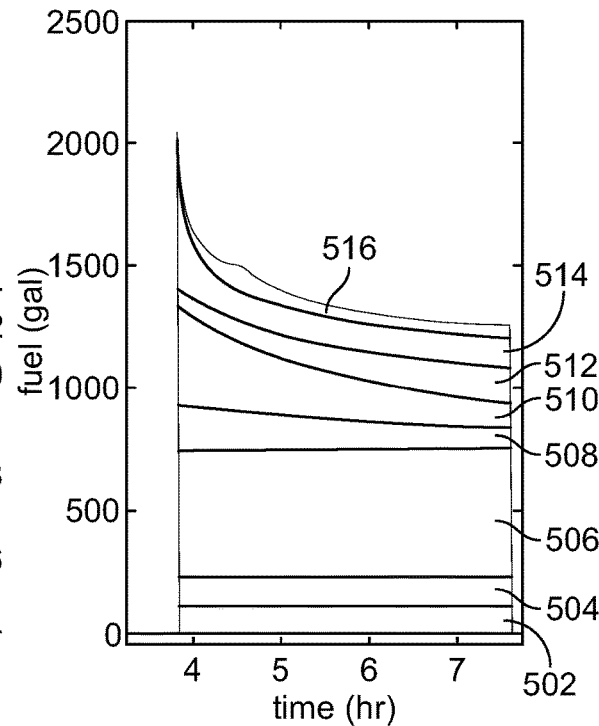
FIG. 5B illustrates an example graph of fuel components as a function of trip time.
Figure 5C:
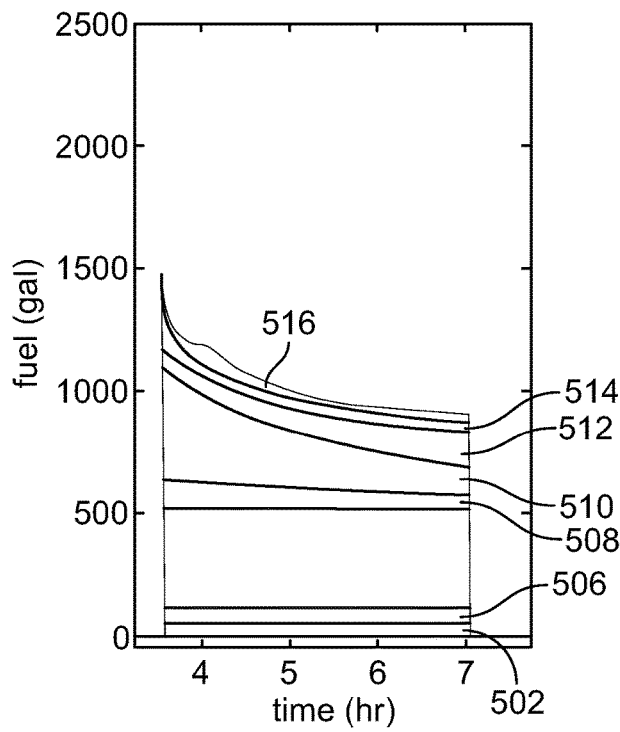
FIG. 5C illustrates an example graph of fuel components as a function of trip time.

FIGS. 5A-5C illustrate the same results as illustrated in FIG. 4 for double the horsepower per ton (HPT). Similar to FIG. 4, FIGS. 5A-5C illustrate fuel components including delta elevation 502, track curvature 504, average drag a 506, average drag b 508, average drag c 510, base 512, minimum braking 514, and drag variation 516. In one example, the section length may be 161 miles with fuel in gallons compared to time in hours. FIG. 5A illustrates the power (e.g., based on the number of propulsion-generating vehicles) may be doubled compared to FIG. 5b, and in FIG. 5C, the weight may be halved. The center plot may be the original HPT for comparison. Doubling the power doubles the base because more propulsion-generating vehicles burn more fuel at idle ($b_{fuel}$ increases). The other components may remain unchanged. Halving the weight leaves the base (since Davis C component may be unaffected by weight) and base components unchanged but reduces all others by at least 50%. The minimum braking may be reduced more that 50%. In this case, drag may be proportionally larger (since the c term remained unchanged) and, therefore decreasing speed faster may require less braking.

Figure 6:
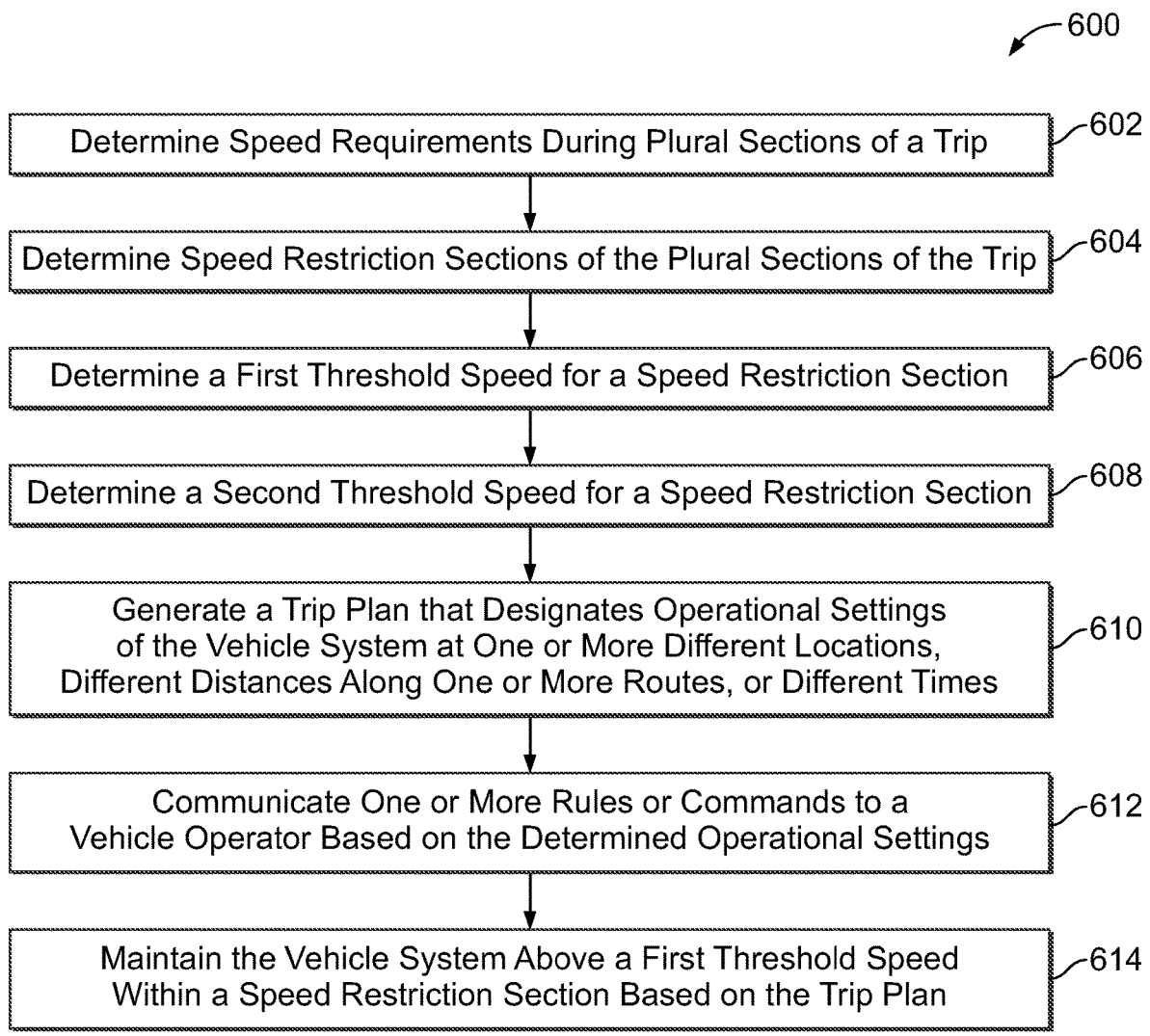
FIG. 6 illustrates a flowchart of one embodiment of a method for generating or modifying a trip plan.

FIG. 6 illustrates a flowchart of one embodiment of a method 600 for generating or modifying a trip plan. The method 600 can represent one or more of the operations performed by the energy management system. The method for generating or modifying the trip plan may be provided such that the trip plan may be quickly formed and explainable to a vehicle operator. In one example, the trip plan may include regions, or sections, where a vehicle may operate at a reduced speed to reduce the burning of fuel. Instructions may include indicating a notch position, or speed the vehicle is not to exceed within a predetermined region. A portable communication device, such as a smart tablet, smart watch, laptop computer, smart phone, etc. may be used by a vehicle operator to receive instructions.

At 602, speed requirements during plural sections of a trip of a vehicle are determined. In one example, an energy management system may make determinations related to the total energy requirements during a trip, including making determinations related to fuel consumption requirements. Based on the total energy requirements, and fuel consumption, the energy management system may break the trip into plural sections, each representative of a portion of the overall trip. In some embodiments, each section may be the same length or distance, such as fifty mile sections. In other examples, the lengths and distances are different. The sections may be based on geographic locations such as state boundaries. Alternatively, sections may be determined based on environmental parameters or terrain such as elevation, elevation change, route curvature, or the like. Based on the total energy requirements and/or the fuel consumption requirements, the energy management system may determine speed restriction sections, or sections of the trip where the vehicle may move at a reduced speed to reduce fuel consumption.

Speed requirements as used herein include any change in operation of the vehicle system that may affect the speed of the vehicle system. As an example, minimum or lower limit threshold operating speeds or maximum or upper limit threshold speeds may be considered speed requirements. This may include thresholds mandated by a governmental authority such as a speed limit, thresholds resulting from traffic increases, thresholds determined based on a population of people or other vehicle systems of a section of a route, etc. Speed requirements may also be based upon load requirements of an engine, prime mover, energy storage device, or the like. In particular, such loading requirements, restrictions, parameters, characteristics, etc. may affect the operating speed of the vehicle system. In another embodiment, a change in fuel efficiency may be considered a speed requirement because changes in fuel consumption may affect the speed of the vehicle system. In yet another example, changes in emission may also be considered a speed requirement, because again, to affect a change in emissions, the speed of the vehicle system must be considered. In another embodiment, environmental conditions, parameters, characteristics, or the like may be considered speed requirements. For example, the condition of a route, such as a track or rail, may cause changes in speed during a section. Alternatively, speed requirement may also be based on road conditions, weather conditions, road construction conditions, etc.

At 604, speed restriction sections of the plural sections of the trip are determined based on the speed requirements determined. As described above, based on the total energy requirements and/or fuel consumption requirements, determinations may be made regarding plural sections of a trip. Alternatively, other determinations, calculations, measurements, parameters, etc. may be utilized to determine speed requirements plural sections of the trip. Specifically, determinations may be made regarding whether a vehicle may operate at a reduced speed within determined speed restriction sections to save and conserve fuel within that section of a trip. The speed restrictions may include at least any of the vehicle based conditions or requirements discussed in relation to 602, or any of the environmental based condition or requirements as discussed in relation to 602.

At 606, the energy management system determines a first threshold speed for a speed restriction section. In particular, for each speed restriction section determined by the energy management system, a first threshold speed may be determined. The first threshold speed may be determined based on the speed requirements determined, including the amount of time for a desired trip, fuel consumption goals, environmental parameters such as route terrain, weather, air resistance, etc., regulation parameters such as speed limits, emission requirements, fuel cost, or the like, other vehicle and traffic along the route, potential braking locations, etc.

In one example, a speed restriction section may be a section along a route that may be coming down from a hillside or mountain. The terrain of the section may include numerous downhill segments followed by uphill segments. The section may extend for one-hundred miles or more. A determination may be made to have the first threshold speed be 40 mph, even though a regulatory speed limit may be 70 mph. Still, when the vehicle system may be operated in this speed restriction section to only provide enough propulsion to maintain the vehicle above 40 mph, significant fuel saving may be realized.

In particular, if the vehicle system were set to operate at 70 mph during an entire 100 mile section, fuel would be used during all flat and uphill segments, while continuous braking would occur during downhill segments. In contrast, when operating to maintain a vehicle above the 40 mph first threshold, brakes do not need to be applied until a 70 mph second speed threshold may be met. Then, when a vehicle reaches a flat or uphill segment of the section, no propulsion force may be provided until the vehicle system again reaches the 40 mph first threshold. Thus, numerous segments of the 100 mile restricted speed section are provided where no, or reduced fuel may be consumed. In addition, even though the speed of the vehicle system may be kept above 40 mph, because of the numerous downhill segments, numerous segments of the speed restriction section are provided where the speed of the train may be greater than 40 mph. Consequently, the average speed for the speed restriction section where the vehicle system may be always kept above 40 mph may be 60 mph based on the downhill terrain of the section. Thus, over the 100 mile restricted speed section significant amounts of fuel are saved, emissions are reduced, brake wear may be reduced, and less than fifteen (15) minutes of time may be added to the trip.

At 608, the energy management system determines a second threshold speed for a speed restriction section. In particular, for each speed restriction section determined by the energy management system, a second threshold speed may be determined. The second threshold speed, similar to the first threshold speed, may be determined based on the speed requirements determined, including the amount of time for a desired trip, fuel consumption goals, environmental parameters such as route terrain, weather, air resistance, etc., regulation parameters such as speed limits, emission requirements, fuel cost, or the like, other vehicle and traffic along the route, etc.

In one example, the second threshold speed may be set by the regulatory speed of a section. So, if a governing body determines 70 mph may be the fastest speed the vehicle system may be allowed to travel along the section, then the second threshold speed may be set at 70 mph. In particular, the vehicle system may ensure the vehicle system does not exceed this limit by reducing power, braking the system, etc. Therefore, in an example, the vehicle system may travel at a speed within a section between the first threshold speed and the second threshold speed.

At 610, a trip plan that designates operational settings of the vehicle system at one or more different locations, different distances along one or more routes, or different times, may be generated or modified. The operational settings may include the operational settings within a speed restriction section. The operational settings may include a throttle setting, braking setting, notch setting, etc.

In one example, a notch setting may be set to operate the vehicle at 40 mph within a speed restriction section. In another example, a brake setting may be set to prevent a vehicle from exceeding a speed of 70 mph during a speed restriction section. In one example, plural potential speed restriction sections may be identified, with the trip plan only providing for a couple of the plural potential speed restriction sections to be speed restriction sections for the trip plan. Specifically, each section may be ordered to build the trip plan meeting time requirements while reducing fuel consumption.

At 612, one or more rules or commands are communicated to a vehicle operator based on the determined operational settings. In an example, the rule, or command, may be the placement of a notch in a specific notch position when a vehicle system enters the speed restriction section. The notch position corresponds to the vehicle operating at the first threshold speed during the speed restriction section. Thus, if during operation in the speed restriction section, the vehicle may not be in danger of exceeding the second threshold speed, or includes a governor feature that automatically brakes or slows the vehicle system above the second threshold speed, the operator does not need to take additional action within the restriction speed section. Consequently, the command provides a simple instruction to the operator of the vehicle that may be easy to follow, and saves significant fuel during the trip.

The rules, or instructions may be displayed on an operating screen for viewing by an operator. In an example, the operating screen does not allow manual inputs or feedback to modify or change the rules and/or instructions. In this manner, human error in responding to simplified instructions may be avoided. In another example, a vehicle operator may manually provide input to adjust control during a section, or segment. In particular, in response to the manual input, a trip plan may be modified and/or updated during the trip as a result of the manual input. To this end, for future trip plans, time allocated to different sections of a trip may be altered in response to manual inputs during a trip. In this manner, additional fuel may be saved during a future trip.

At 614, the vehicle system maintains the vehicle system above a first threshold speed within a speed restriction section based on the trip plan. As indicated above, the first threshold speed may be a minimum speed determined for reducing fuel consumption within the speed restriction section. By reducing the speed, and maintaining the speed above the first threshold speed and below a second threshold speed, or maximum speed that would result in a faster trip time, fuel may be saved during the trip. In one example a driver operates the vehicle system to maintain the vehicle system above the first threshold speed within the speed restriction section based on the trip plan. Alternatively, the vehicle system automatically maintains the vehicle system above the first threshold speed by operating at a determined throttle or notch setting.

Additionally, as discussed above, the vehicle system does not generate supplement propulsion force in the vehicle system until the first threshold speed is reached, based upon the trip plan. For example, when a vehicle system may be traveling down a steep hill or mountain side, the trip plan may call for operating in neutral, or without any propulsion provided by the vehicle system while going down the steep terrain. This may result in the vehicle system exceeding the first threshold speed; however, because no fuel is being consumed and the second threshold speed is not reached, there may be no reason to brake or take measures to slow down the vehicle. Upon exiting the steep decline, if the terrain turns into an incline, the vehicle system will begin the ascent up the incline at a speed above the first threshold speed. At this time, as the vehicle begins working against gravity, the vehicle will begin to slow. However, the vehicle system does not begin generating supplemental propulsion force in the vehicle system to counteract the speed decrease resulting from the incline. Instead, based on the trip plan, supplemental propulsion force is not generated until the vehicle system reaches the first threshold speed. At that time, an engine or driver reengages to generate supplemental propulsion force and maintain the vehicle system speed at the first threshold speed. In this manner, the vehicle system reduces the amount of fuel consumption resulting from generating propulsion forces to drive the vehicle system.

Figure 7:
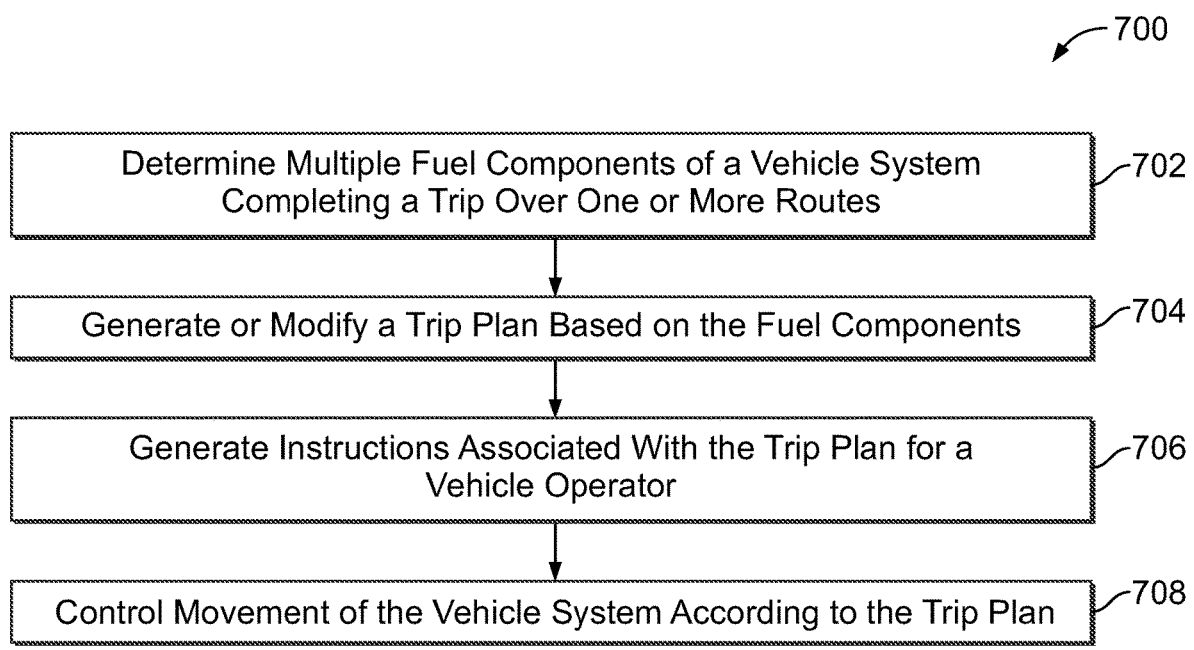
FIG. 7 illustrates a flowchart of one embodiment of a method for generating or modifying a trip plan.

FIG. 7 illustrates an alternative method 700 for generating or modifying a trip plan. In this example, the trip plan may be based on multiple fuel components. In one example the multiple fuel component may be used to make determinations related to speed restriction sections of a trip and operating a vehicle system accordingly within each speed restriction section. Alternatively, the multiple fuel components may be used to vary operational setting of a vehicle system throughout a trip.

At 702, multiple fuel components that represent fuel consumption by a vehicle system completing a trip over one or more routes are determined. The multiple fuel components that are determined include two or more of a delta elevation component of the one or more routes, a delta speed component of the trip, a mean drag component of the vehicle system, a curvature component of the one or more routes, a base fuel component of the vehicle system, a minimum braking component of the vehicle system, a braking auxiliaries component of the vehicle system, and/or a drag variation of the vehicle system. In making these determinations, the regions for fuel savings (economy) may be identified. In one example, for a rail vehicle, a region may be identified based on braking operations. Specifically, based on terrain, environment, etc. reduced braking may be desired to improve fuel economy. Alternatively, a trip plan may identify regions were a trade-off between fuel and time may be promoted. Thus, by determining fuel components, regions may be quickly identified for forming a trip plan.

At 704, a trip plan may be generated or modified based on the fuel components that are determined. The trip plan designates operational settings of the vehicle system at one or more of different locations, different distances along the one or more routes, or different times. The trip plan generated may provide human understandable instructions and rules, including minimum speeds for a region, a notch setting for a region, indicating location to use braking for a region, indicating location for recharging battery for electric and hybrid vehicles, etc. The trip plan generated may also identify wayside charging areas and/or allocate mobile wayside assistance, identify regions and quantify benefit for infrastructure improvements such as increased speed limits, and for hybrid vehicles, identify areas for hybrid power boost and slowdown. The human understandable rules facilitate understanding of the trip plan by the vehicle operator, increases proper use of the trip plan to save fuel and/or meet other trip objectives.

At 706, instructions and the trip plan are generated for a vehicle operator. While in this example embodiment the instructions and rules are generated as a result of fuel components, in other example embodiments instructions and rules may be provided for other vehicle or route operational parameters, characteristics, conditions, or the like. This may include instructions and rules related to vehicle system speed, vehicle system emissions, vehicle system safety, vehicle system trip scheduling, etc. Specifically, the instructions for the vehicle operator may provide the rules to follow within predetermined regions.

As described herein, rules may be considered any conditions relating to operating a vehicle system, including a restriction of movement of the vehicle system. In one example, the rules are that in a first determined section the vehicle is not to travel above 30 miles per hour (mph), whereas in a second determined section, the vehicle is not to travel above 50 mph. In another example, the rule may be a threshold fuel efficiency for a trip, or section of a route of a trip. In another example, a rule may be provided related to emissions of a vehicle system during a trip or section of a route of a trip. The rules may similarly provide safety based information, including information provided or determined based on communication from a positive train control (PTC) system.

In another example, when rail vehicles are provided, determinations may be made by a movement or yard planner off-board the vehicle and at a rail vehicle yard. The off-board yard planner may communicate with a portable communication device of the operator. The portable communication device may include a smart tablet, smart phone, smart watch, vehicle console, laptop computing device, or the like. In one example, a smart tablet may include a computer based application, or app, for short lines where simple rules versus distance may be communicated to the vehicle operator. Alternatively, trip plans for multiple trip times are generated to provide an easy trade-off of fuel versus time in an explainable segment of the trip.

An off-board yard planner may communicate the trip plan, identified wayside charging stations, etc. for use by the vehicle operator. Specifically, a energy management system infrastructure may be required, and may include a track database and simple input for the route length. In one example, a model predictive control (MPC) with fast simulations (FastSim) may be used to determine the instructions to provide. MPC may include positive predictive control such a PTC and/or negative predictive control. In particular, positive control systems are systems that only allow action, movement, etc. where a signal providing permission or authority to act, or move may be granted. That is, the default action if no signal is received may be to not act or move. Negative control systems may describe when the default may be provided to act or move, and only refrain from acting or moving when a signal communicating to not act or move may be received.

The instructions, including at least one rule may be displayed on an operating screen for viewing by an operator. In an example, the operating screen does not allow manual inputs or feedback to modify or change the instructions. In this manner, human error in responding to simplified instructions may be avoided. In another example, a vehicle operator may manually provide input or feedback to adjust control during a section, or segment. In particular, in response to the manual input, a trip plan may be modified and/or updated during the trip as a result of the manual input. To this end, for future trip plans, time allocated to different sections of a trip may be altered in response to manual inputs during a trip. In this manner, additional fuel may be saved during a future trip.

The instructions in one example may include identification of charging areas and/or allocate a mobile wayside assist device for electric and hybrid vehicles. Similarly, the instructions may identify segments where infrastructure improvements are provided that provide an opportunity for increased speeds as a result of increased speed limits during operation. The instructions may even quantify the speed limit or recommended speed during a section of the trip for the vehicle operator. Alternatively, instructions for use of an airbrake may be provided. While in examples, simplified instructions may be provided, as a fall back, a energy management system or trip plan may be utilized.

Optionally, the instructions, including at least one rule may be updated during the trip. Specifically, as a vehicle moves along one or more routes, different instructions and different rules may be determined based on the section of the one or more routes. For example, a vehicle system may go from a first section on a route that has a speed limit of sixty mph to a second section on the route that has a speed limit of forty mph. Upon reaching the second section, the instructions and rule displayed may change to indicate that the vehicle system should be operated at forty mph because of a speed limit change. In this manner, the vehicle operator understands why an instruction for change is provided. As a result, instead of a vehicle operator deciding to ignore the instructions and rule to reduce speed because a vehicle system is behind schedule and the vehicle operator is unaware of the speed limit change, the vehicle operator may be informed and reduce the speed of the vehicle system.

In another example, new information may be provided to the vehicle system, including that unexpected heavy traffic may be ahead on a route prompting an update of the instructions and at least one rule. As a result of receiving the information about a traffic slow down the instructions may change to indicate to reduce speed for oncoming traffic slow down. Again, the vehicle operator is informed of the new rule, the reduced speed, along with a reason for the new rule, making the operator more likely to comply with the rule change.

In yet another example, the instruction may allocate a time for following the at least one rule. For example, the rule may be to travel at forty mph while traveling a determined section on the route because the determined section is in a heavily populated, or high traffic area. However, traffic may only be heavy between 6:00 AM and 7:00 PM. Thus, the instruction may allocate a time period when the rule should be followed. In this manner, the operator may be better informed and save time during the trip.

At 708, optionally, movement of the vehicle system optionally may be controlled according to the trip plan. For example, the throttle settings and/or brake settings of the vehicle system can be changed over the course of the trip according to the trip plan. In particular, the vehicle operator may follow the simplified instructions to implement the trip plan. Because of the simplified instructions, the trip plan may be more closely followed than when instructions are not simple, improving on the accomplishment of objectives of the trip plan.

In one or more embodiments a method may be provided that includes determining speed requirements during plural sections of a trip of a vehicle system, determining at least one speed restriction section of the plural sections of the trip based on the speed requirements determined, and generating or modifying a trip plan that designates operational settings of the vehicle system at one or more of different locations, different distances along the one or more of the plural sections, or different times, including the operational settings within the at least one speed restriction section. The vehicle system may be then maintained above a first threshold speed within the at least one speed restriction section based on the trip plan, and supplemental propulsion force is not generated in the vehicle system in the at least one speed restriction section until the first threshold speed may be reached, based on the trip plan.

Optionally, the method also includes determining the first threshold speed within the at least one speed restriction section based on fuel consumption during the trip. The method may also include determining a second threshold speed within the at least one speed restriction section; and maintaining the vehicle system below the second threshold speed within the at least one speed restriction section based on the trip plan. In one aspect, the second threshold speed may be based on a regulatory requirement. In another aspect, the first threshold speed may be less than the second threshold speed.

Optionally, determining the at least one speed restriction section of the plural sections of the trip based on the speed requirements determined includes determining fuel consumption of the vehicle system during the trip, and determining the speed requirements based on reducing the fuel consumption determined.

Optionally, the method may also include automatically controlling movement of the vehicle system according to the trip plan. In an example, the operational settings of the vehicle system include at least one of speed, tractive power, tractive effort, braking effort, or braking power.

In one embodiment, an energy management system includes one or more processors configured to determine multiple fuel components that represent fuel consumption by a vehicle system completing a trip over one or more routes. The one or more processors are configured to generate or modify a trip plan that designates operational settings of the vehicle system at one or more of different locations, different distances along the one or more routes, or different times. The one or more processors are configured to generate or modify the trip plan based on the multiple fuel components. The multiple fuel components that are determined by the one or more processors including two or more of a delta elevation component of the one or more routes, a delta speed component of the trip, a mean drag component of the vehicle system, a curvature component of the one or more routes, a base fuel component of the vehicle system, a minimum braking component of the vehicle system, a braking auxiliaries component of the vehicle system, and/or a drag variation of the vehicle system.

Optionally, the one or more processors are configured to automatically control movement of the vehicle system according to the trip plan.

Optionally, the delta elevation component may be based on a mass of the vehicle system and terrain of the one or more routes.

Optionally, the delta speed component may be based on a mass of the vehicle system.

Optionally, the mean drag component may be based on a mass of the vehicle system, a time of the trip, a distance of the trip, and a number of axles in the vehicle system.

Optionally, the curvature component may be based on a mass of the vehicle system and a layout of the one or more routes.

Optionally, the base component may be based on a time of the trip.

Optionally, one or more of the minimum braking component or the braking auxiliary component may be based on a mass of the vehicle system and a terrain of the one or more routes.

Optionally, the drag variation component may be based on a mass of the vehicle system, a time of the trip, and a speed profile of the trip.

Optionally, the one or more processors are configured to determine the delta elevation component as a change in potential energy of the vehicle system between a beginning location and an ending location of the trip.

Optionally, the one or more processors are configured to determine the delta speed component as a difference between a kinetic energy of the vehicle system at a beginning location and the kinetic energy of the vehicle system at an ending location of the trip.

Optionally, the one or more processors are configured to determine the drag component as an amount of energy needed to overcome drag exerted on the vehicle system during the trip.

Optionally, the one or more processors are configured to determine the curvature component as a resistance energy to movement of the vehicle system over one or more curves in the one or more routes during the trip.

Optionally, the one or more processors are configured to determine the minimum braking component as a sum of energies used to slow movement of the vehicle system to no faster than one or more upper speed limits of the one or more routes over an entire duration of the trip.

Optionally, the one or more processors are configured to determine the braking auxiliary component as an amount of fuel consumed during dynamic braking events of the vehicle system.

In one embodiment, a method includes determining multiple fuel components that represent fuel consumption by a vehicle system completing a trip over one or more routes and generating or modifying a trip plan that designates operational settings of the vehicle system at one or more of different locations, different distances along the one or more routes, or different times. The trip plan is generated or modified based on the multiple fuel components. The multiple fuel components include two or more of a delta elevation component of the one or more routes, a delta speed component of the trip, a mean drag component of the vehicle system, a curvature component of the one or more routes, a base fuel component of the vehicle system, a minimum braking component of the vehicle system, a braking auxiliaries component of the vehicle system, and/or a drag variation of the vehicle system.

Optionally, the one or more processors are configured to automatically control movement of the vehicle system according to the trip plan.

Optionally, the delta elevation component may be based on a mass of the vehicle system and terrain of the one or more routes.

Optionally, the delta speed component may be based on a mass of the vehicle system.

Optionally, the mean drag component may be based on a mass of the vehicle system, a time of the trip, a distance of the trip, and a number of axles in the vehicle system.

Optionally, the curvature component may be based on a mass of the vehicle system and a layout of the one or more routes.

Optionally, the base component may be based on a time of the trip.

Optionally, one or more of the minimum braking component or the braking auxiliary component may be based on a mass of the vehicle system and a terrain of the one or more routes.

Optionally, the drag variation component may be based on a mass of the vehicle system, a time of the trip, and a speed profile of the trip.

Optionally, the delta elevation component may be based on a change in potential energy of the vehicle system between a beginning location and an ending location of the trip.

Optionally, the delta speed component may be based on a difference between a kinetic energy of the vehicle system at a beginning location and the kinetic energy of the vehicle system at an ending location of the trip.

Optionally, the drag component may be based on an amount of energy needed to overcome drag exerted on the vehicle system during the trip.

Optionally, the curvature component may be based on a resistance energy to movement of the vehicle system over one or more curves in the one or more routes during the trip.

Optionally, the minimum braking component may be based on a sum of energies used to slow movement of the vehicle system to no faster than one or more upper speed limits of the one or more routes over an entire duration of the trip.

Optionally, the braking auxiliary component may be based on an amount of fuel consumed during dynamic braking events of the vehicle system.

In another embodiment, a system may be provided with one or more processors configured to determine multiple fuel components that represent fuel consumption by a vehicle system completing a trip over one or more routes. The one or more processors may be configured to generate or modify a trip plan that designates operational settings of the vehicle system at one or more of different locations, different distances along the one or more routes, or different times, the one or more processors configured to generate or modify the trip plan based on the multiple fuel components, and generate instructions for a vehicle operator that provide at least one rule to following within a determined section.

Optionally, the at least one rule to follow within the determined section may be associated with one of a throttle setting, a notch setting, or brake setting.

Optionally, the instructions generated are based on the multiple fuel components.

Optionally, the one or more processors may also be configured to modify or update the instructions including the at least one rule during the trip.

Optionally, the one or more processors may also be configured to display the instructions on a display on-board the vehicle system and in communication with the one or more processors.

Optionally, the one or more processors may also be configured to determine an allocation of time for following the at least on rule and generating the instructions based on the allocation of time determined.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   determining total energy requirements during a trip;
   determining speed requirements during plural sections of the trip of a vehicle system based on the total energy requirements;
   determining at least one speed restriction section of the plural sections of the trip based on the speed requirements that are determined;
   modifying a trip plan that designates operational settings of the vehicle system at one or more of different locations, different distances along one or more of the plural sections, or different times, based on the total energy requirement determined, the trip plan designating the operational settings within at least the at least one speed restriction section;
   maintaining the vehicle system above a first threshold speed within the at least one speed restriction section based on the trip plan; and
   limiting supplemental propulsion force in the vehicle system in the at least one speed restriction section until the first threshold speed is reached, based on modifying the trip plan based on the total energy requirements.

2. The method of claim 1, further comprising:
   determining the first threshold speed within the at least one speed restriction section based on fuel consumption during the trip.

3. The method of claim 2, further comprising:
   determining a second threshold speed within the at least one speed restriction section; and
   maintaining the vehicle system below the second threshold speed within the at least one speed restriction section based on the trip plan.

4. The method of claim 3, wherein the second threshold speed is based on a route requirement or vehicle requirement.

5. The method of claim 3, wherein the first threshold speed is slower than the second threshold speed.

6. The method of claim 1, further comprising:
   determining fuel consumption of the vehicle system during the trip, wherein the speed requirements are determined based on reducing the fuel consumption that was determined.

7. The method of claim 1, further comprising automatically controlling movement of the vehicle system according to the trip plan.

8. The method of claim 1, wherein the operational settings of the vehicle system include at least one of speed, tractive power, tractive effort, braking effort, or braking power.

9. The method of claim 1, wherein the vehicle system is a rail vehicle.

10. The method of claim 1, wherein the vehicle system includes plural vehicles.

11. A system comprising:
one or more processors configured to:
- determine total energy requirements during a trip;
- determine speed requirements during plural sections of the trip of a vehicle system based on the total energy requirements;
- determine at least one rule based on the speed requirements that are determined;
- modify a trip plan that includes the at least one rule and that designates operational settings of the vehicle system at one or more of different locations, different distances along the one or more routes, or different times, based on the total energy requirements determined;
- limit a supplemental propulsion force in the vehicle system until a first threshold speed is reached, based on modifying the trip plan based on the total energy requirements;
- generate instructions that provide the at least one rule to follow within a determined section; and
- display the instructions on a display on-board the vehicle system.

12. The system of claim 11, the one or more processors are configured to: control movement of the vehicle system based on the instructions.

13. The system of claim 11, the one or more processors are configured to modify or update the instructions including the at least one rule during the trip.

14. The system of claim 11, the one or more processors are configured to determine an allocation of time for following the at least on rule and generating the instructions based on the allocation of time that was determined.

15. The system of claim 11, the one or more processors are configured to modify or update the instructions including the at least one rule during the trip.

16. The system of claim 11, wherein the one or more processors are configured to automatically control movement of the vehicle system according to the trip plan.

17. The system of claim 11, wherein the vehicle system is a rail vehicle.

18. The system of claim 11, wherein the vehicle system includes plural vehicles.

* * * * *